US009612427B2

(12) United States Patent
Siano et al.

(10) Patent No.: US 9,612,427 B2
(45) Date of Patent: Apr. 4, 2017

(54) MICROSCOPY OPTOELECTRIC DEVICE WITH FOCUS SCANNING

(75) Inventors: Salvatore Siano, Poggio a Caiano (IT); Andrea Azelio Mencaglia, Chiusi (IT); Ilaria Cacciari, Florence (IT)

(73) Assignee: CONSIGLIO NAZIONALE DELLE RICERCHE, Rome (IT)

( * ) Notice: Subject to any disclaimer, the term of this patent is extended or adjusted under 35 U.S.C. 154(b) by 347 days.

(21) Appl. No.: 14/235,868

(22) PCT Filed: Jul. 31, 2012

(86) PCT No.: PCT/IB2012/053905
§ 371 (c)(1),
(2), (4) Date: Jan. 29, 2014

(87) PCT Pub. No.: WO2013/018030
PCT Pub. Date: Feb. 7, 2013

(65) Prior Publication Data
US 2014/0184779 A1    Jul. 3, 2014

(30) Foreign Application Priority Data
Aug. 1, 2011    (IT) .............................. RM2011A0415

(51) Int. Cl.
G02B 21/06    (2006.01)
G02B 21/00    (2006.01)
(52) U.S. Cl.
CPC ..... G02B 21/0032 (2013.01); G02B 21/0008 (2013.01)

(58) Field of Classification Search
CPC .. G02B 6/4221; G02B 7/001; G02B 21/0008; G02B 21/32; A61B 90/20; A61B 90/25
See application file for complete search history.

(56) References Cited

U.S. PATENT DOCUMENTS 4,650,296 A    3/1987  Tsuchiya
5,216,545 A *  6/1993  Saito ...................... G02B 21/02
                                                        359/656

(Continued)

FOREIGN PATENT DOCUMENTS

EP    1416310 A1   5/2004
JP    2009036846 A  2/2009
JP    2011017784 A  1/2011

*Primary Examiner* — Christopher Findley
(74) *Attorney, Agent, or Firm* — Volpe and Koenig, P.C.

(57) ABSTRACT

A microscopy optoelectronic device for reconstructing a three-dimensional model of a sample, which can be connected to any PC in order to obtain three-dimensional surface micro-reliefs, includes a portable device body, having a casing and a frame supporting: a digital optical sensor; an optical group, coupled to the sensor including an objective lens directed towards a distal end of the device body, faceable towards the sample; a motor that translates the optical group and sensor with respect to said frame; a connector to connect the device body to an energy source and to a device that controls the position of the optical group and to transmit the digitalized images; and a light source that provides diffused lighting at the objective lens arranged to surround a front region with respect to the objective lens and also includes a luminescent and diffusing surface having a tubular portion coaxial to the optical group.

19 Claims, 2 Drawing Sheets

(56) References Cited

U.S. PATENT DOCUMENTS

2005/0031192 A1\* 2/2005 Sieckmann .......... G02B 21/367
                                                    382/154
2006/0077536 A1   4/2006 Bromage et al.
2011/0134234 A1\* 6/2011 Kim .................... A61B 1/00105
                                                    348/80
2013/0181246 A1\* 7/2013 Wu ........................ G02B 6/001
                                                    257/98

\* cited by examiner

MICROSCOPY OPTOELECTRIC DEVICE WITH FOCUS SCANNING

FIELD OF THE INVENTION

The object of the present invention is an optoelectronic device with focus scanning for reconstructing a three-dimensional model of a sample, preferably with great portability features.

BACKGROUND

Devices as specified above are known, which adopt the focus scanning technique, which provides to take a plurality of images with the same optoelectronic device, by varying, for each image, the focal position of the optics associated to the device by a known pitch along the focal axis.

This set of images is subsequently re-processed via software to identify, for each image, only the in-focus image portion, so as to compose a three-dimensional relief of the examined surface associating, to each planar coordinate, a quote and a corresponding chromatic piece of information.

Such relief results then from the proper re-composition of the in-focus portions of all taken images by associating to each one thereof the quote which is determined by the focal position of the corresponding in-focus portion.

The known devices use supporting frames, known as stands from microscopy, for the positioning of the properly said optoelectronic device, also providing a plane base provided ad hoc or constituted by the same table or plane thereon the instrument is rested. This base constitutes the sample-bearing support which is lightened directly by a light source. Said optoelectronic device is then connected to a driving electronic module, in turn connected to a PC, or to a console dedicated to the instrument control and to the digital processing of the acquired images.

Therefore, the existing microscopes with focus scanning are substantially fixed instruments and they are not conceived as portable devices for the use thereof on field.

This limits the applicability thereof, in particular in fields such as the medical one, the archaeological one, the preservative restoration, the investigating examinations, the quality controls of an industrial process, the jewellery, the authentication and traceability of quality products and cultural goods, the opposition to counterfeiting and to the illicit trafficking of the same and so on, wherein the fact of not moving the investigated object from the site where it is located is necessary or however of primary significance.

On this matter, one thinks, for example, about a skin defect, a picture surface, a manufacturing surface defect, the recognition of trademarks and working traces in the authentication of metallic manufactured goods, an investigating evidence or others.

The US patent application Nr. US2011/134234 of 9 Jun. 2011 relates to a portable electronic microscope, but not of the type with focus scanning, wherein the optical group is moved manually and wherein the lightning is of the diffusing type, but produced by a light crown with a plane surface substantially parallel to the surface wherein the sample lies.

The Japanese patent application Nr. JP 2011/017784 of 27 Jan. 2011 relates, instead, to a microscope with extended samples with an optical group mounted on guides, in order to vary the optics position from the sample plane.

The US patent Nr. U.S. Pat. No. 4,650,296 of 17 Mar. 1987 relates to a conventional microscope wherein an optical group is mobile thanks to a translation mechanism with spiral cam.

The US patent application Nr. US 2006/077536 of 13 Apr. 2006, at last, relates to a confocal microscopy device with a complex positioning frame.

The technical problem underlying the present invention is to provide a microscopy optoelectronic device which can be used in a portable way, set free from laboratory apparatuses, by obviating the mentioned drawbacks with reference to the known art and by adopting the focus scanning technique.

SUMMARY

The solution idea consists in using a structure connected to one single frame thereto a particular diffusing lighting device preferably, but not necessarily, integral to the optics.

Such problem is solved by a device as above specified and as defined in the enclosed claim 1.

The main advantage of the optoelectronic device and of the lighting device used therein, which can be used both in microscopy and in the similar field of the photography and of the video shooting in the so-called macro mode, according to the present invention consists in providing a lighting and an inner motion integrated in one single solution, able to perform the relief of a surface detail according to the focus scanning technique, thus by providing the possibility of implementing a portable device, which can be used in field.

BRIEF DESCRIPTION OF THE DRAWINGS

The present invention will be described hereinafter according to a preferred embodiment thereof, provided by way of example and not with limitative purpose, with reference to the enclosed drawings, wherein.

DETAILED DESCRIPTION OF THE PREFERRED EMBODIMENTS

Figure 1:
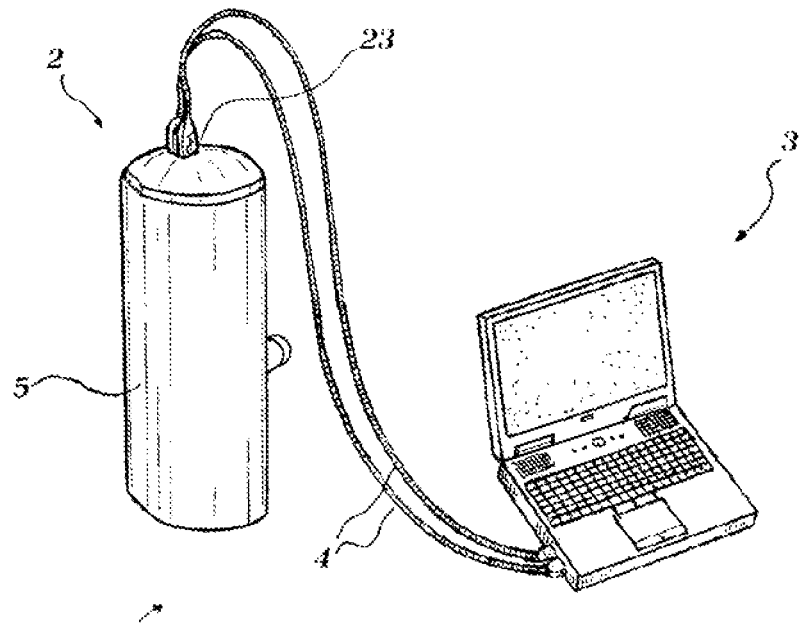
FIG. 1 shows a perspective and schematic view of an optoelectronic device according to the invention, in a use configuration thereof.
Figure 2:
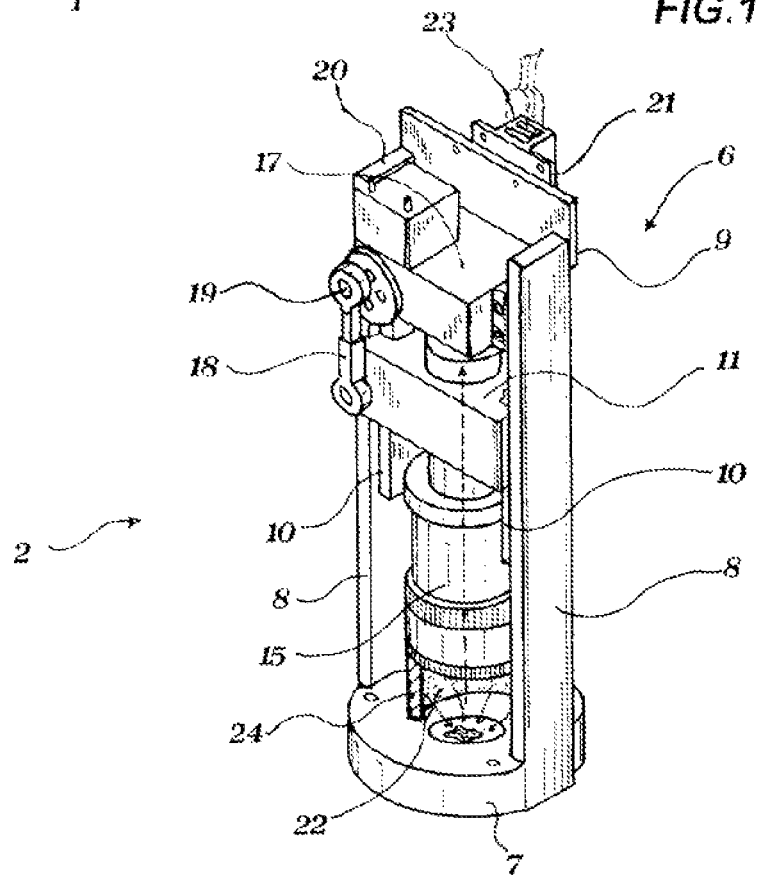
FIG. 2 shows a side perspective view in partial section of the optoelectronic device of FIG. 1.
Figure 3:
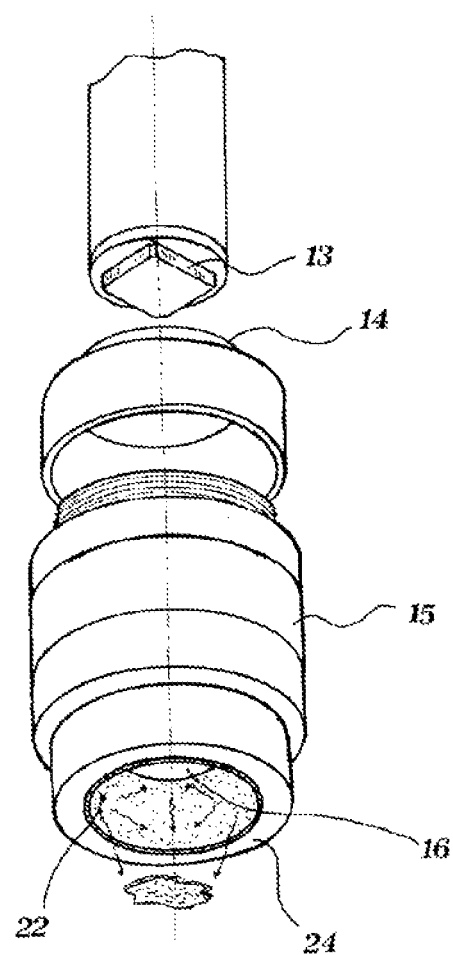
FIG. 3 shows a partially exploded bottom perspective view of the optoelectronic device of FIG. 1.

By referring to the figures, a three-dimensional digital microscopy optoelectronic device with focus scanning is designated as a whole with 1. By referring to FIG. 1, it comprises a portable optoelectronic device body 2, connected through a wire 3 to a portable PC 4, in a mode which will be described hereinafter in details. The portable PC 4, equivalent to any other processing means, includes a software properly arranged for controlling the device 1 and for processing the images obtained therewith in order to produce a three-dimensional acquisition of the surface under examination.

The body of the device 2 comprises a casing 5 which, in turn, encloses inside thereof a supporting frame 6, in the present example constituted by a ring-like base 7 thereto two opposed uprights 8 and a top crossbar 9 are connected.

However, it is meant that the upright could be only one, in case integrated in a body acting as frame and container.

The ring-like base 7 corresponds to the distal end of the device body, apt to be directed and faced to a sample surface to be examined, the three-dimensional relief thereof is to be obtained according to the previously mentioned focus scanning technique. The relief, that is the shooting for all the images necessary to obtain it, is then performed through the opening of the ring-like base 7.

Respective rectilinear guides 10 are formed on the inner faces of the uprights 8, a cursor 11 is interposed between said uprights, slidingly connected to said guides 10. In case of a single guide and/or single upright, the cursor will be slidingly mounted with respect thereto.

The cursor 11, in turn, supports an optical group 15 and a digital optical sensor 13 which picks up the transmitted image thereof through the optics, in particular a sensor of CCD or CMOS type; an aspherical lens 14 is interposed between the sensor 13 and the optical group 15, at a minimum distance from the outlet lens of the latter. In this way, the sensor 13 and the optical group 15 are coupled therebetween.

The optical group 15 acts as device objective lens and in the present example it is a magnifying optics and it has a fixed focus, unless the magnifying is variable, being understood that, during the relief, the optics is used with the fixed focus.

To this purpose, the optical group 15 comprises any number of lenses, suitable to obtain the requested magnifying, thereamong an inlet lens 16, directed towards the opening of the ring-like base 7, and the already mentioned outlet lens.

It is further meant that the aspherical lens 14 can be integrated in the same optical group 15.

In other terms, a certain configuration wherein the position of the aspherical lens 14 is fixed with respect to the plane of the sensor 13, once fastened the focal length of the inlet lens 16 and the distance thereof from the aspherical lens 14, defines an object plane which will have a corresponding image plane coincident with that of the sensor 13.

The optical group 15 has a focal which can be comprised, for example, in the range between 8 and 100 mm. Its inlet lens 16 is positioned so as to work at a distance from the surface to be examined almost coincident with its focal distance, therefore the image plane is at great distance, that is almost at the infinite.

The optical and geometrical features of the three optical components: sensor 13, aspherical lens 14 and optical group 15, contribute to determine the system features: focus depth, magnification, field of view.

The cursor 11 is connected to a rotary electric motor 17 through a connecting rod mechanism 18, to transform the rotation of the drive shaft 19 into translation of the cursor 11 with respect to the guides thereof 10.

The motor 17 is electrically fed through a control card (driver) 21 and a possible DC/AC converter 20 is also provided for feeding the lighting 22 which will be detailed hereinafter.

In the present example, these three components are connected to the crossbar 9 to be integral to the frame 6, inside the casing 5.

The motor 17 is of the type with low supply voltage and it requires an extremely low power. Even the converter 20 and the driver 21 have reduced sizes, by allowing the integration thereof on the instrument head.

By purely way of example, the relevant electrical features of a motor example can be an operating voltage of 4.8÷6.0 V, a current from 480 to 1066 mA; whereas the mechanical features can be a maximum speed of 300°/sec and a torque of 7.7 kg*cm, a rotation provided on a circle arc, for example of 180°.

For the present embodiment example the motor 17, the connecting rod 18 and the cursor 11 constitute motor means for translating all optical components, sensor 13, aspherical lens 14 and optical group 15, integral one to the other one. The connecting rod drive could be replaced by a screw drive or by a cam system or by a rack system, however to implement a unidirectional translation and control, with a pitch or ring nut motion.

In the present example the control card 21 comprises a pair of USB ports 23, one thereof is dedicated to the power supply, to the driving and to the data transfer of the sensor 13, the other one to the power supply and to the driving of the motor 17.

From the two USB ports 23, at last, even the power supply for the lighting device 22 is obtained through the DC/AC converter 20.

Therefore, in the present example, said USBs 23 constitute means for connecting the optoelectronic device to an energy source and to a device for controlling the position of the optical components 13, 14, 15, as well as for transmitting the digitalized images to a processor which in this example is constituted by the PC and by the related software.

In the present example, the USB ports 23 are used for feeding the motor 17 and the lighting means, through said DC/AC converter 20, which will be described hereinafter, directly from the processor used for treating the images, without intermediate feeders.

To this purpose, instead of the USB ports 23, ports of different type can be used, for example Firewire®, Ethernet®, HDMI® or the like.

It is further meant that the sizes, the weight and the required power would allow even to adopt a rechargeable and/or interchangeable battery which could be arranged in the casing 5.

Furthermore, the control card 21 could communicate with data processing means in a wireless mode, for example according to a Wi-Fi®, Blue-Tooth® protocol or similar ones, by eliminating the need for connecting cables.

It is further meant that the device could be equipped with an extractable memory, for example a memory card according to one of the available standards, for example, SD® or MicroSD®, on condition that it has adequate capacity. This support can then be used to transfer the digital file in a processor for the image three-dimensional re-composition with focus scanning.

The optical group 15 could be with variable magnifying, by modifying the mutual position of its lenses. Even this motion, which could constitute an additional feature of the invention, could be controlled through the card 21 and operated through a conventional mechanical connection, in case associated to a second motor, of the type already used in the lenses for the CCD/CMOS cameras and television cameras.

At the objective lens 16, the device 1 comprises means for providing a diffused lighting, in particular but not exclusively integral to the optical components together thereof they would be translated by the motor 17.

Alternatively, the means could be instead fixed, associated to the base 7.

The means for the diffused lighting are pre-arranged so as to surround a front region with respect to the objective lens without being perpendicular to the surface to be examined pre-arranged in front of said objective lens.

In this way, the diffused lighting comes however from all directions, to light the surface to be examined, near the objective lens 16, in a uniform way and without hot spots.

Preferably, the means for the diffused lighting comprises a luminescent and diffusing surface surrounding said front region with respect to the objective lens 16, formed by a wall providing these luminescence properties.

The wall itself could be constituted by a sheet of fluorescent or preferably electroluminescent material.

An electroluminescent sheet can be of polymeric type, based upon the known technology such as PolyLED or PLED (Polymeric Light Emitting Diode), wherein a polymeric sandwich is fed by alternated electric current, typically at 110 V, formed by a conductive electroluminescent polymer which emits light when it is fed by said outer voltage.

A variant can comprise a sandwich comprising a fluorescent inner dielectric layer of phosphoric type comprised between two conductive layers which then result to behave like a capacitor, according to the technology known as LEC (Light Emitting Capacitor).

Preferably the electroluminescent sheet can be shaped according to a preferred form, to obtain a better lighting.

The chosen form can be simply tubular, in case with circular section, or can even have a cap-like portion, pierced at the objective lens 16.

From the shape of said electroluminescent sheet in the present embodiment example a lighting member 22 is obtained. It is inserted in a circular tubular support 24 which is connected, for example screwed, to the optical group 15 at the objective lens.

In this case the lighting member has a substantially cylinder-like shape, coaxial to the above described optical group, and it is pre-arranged to produce a diffused light in a front region with respect to the objective lens 16, interposed between it and a surface to be examined.

The tubular portion of the lighting member 22, formed by walls substantially parallel to the focal axis of the optical group 15 or by a single wall with a substantially circular development, is not directed towards the surface to be examined and therefore it produces a substantially oblique light both with respect to the outlet lens 16 and to the surface to be examined. The more the wall edge is brought closer to the outlet lens and/or to the surface to be examined, the more the oblique component of said light is great.

Ideally, such component can reach 100% of the total light falling upon the sample, wherein one images a source with height much smaller than its diameter and a working distance almost coincident with said height. Preferably, the oblique component has to be at least 50% of the light wholly emitted by the lighting member 22.

In this embodiment example then a lighting member 22 is described constituted by a tubular tract with vertical section, with a single curve wall parallel to the focal axis of the optical group 15.

Alternatively, the lighting member 22 can be always constituted by a tubular portion, but with squared or rectangular section, with plane walls but still parallel to said focal axis or in each case a finite number of substantially plane walls, which define distinct lighting directions.

Each wall could be fed independently from the other ones, thus by allowing the selective, apart from overall, lighting thereof. In this way, images could be obtained with oblique and side lighting, in order to highlight directional or partially directional surface textures.

In the present example, said shaped sheet is made of an electroluminescent polymer as mentioned above and it requires a simple alternated current power supply, provided in the present example by the USB ports 23 on the control card 21 and by the converter 20, preferably in parallel to the electric power supply of the motor and with the data transmission.

Such type of lighting member guarantees a uniformly diffused light, with uniform angular distribution. This property allows a good lighting without shadow areas and hot spots, this last aspect being very important above all when metallic objects have to be examined, with the possibility of highlighting the level edges by properly adjusting sizes and arrangement of the shaped sheet, thus with the possibility of moving angularly the reflection peaks and to highlight better the unevennesses of the surface under examination.

The above described instrument is then used by positioning it near the surface to be examined: by simply resting it in case of a surface allowing it, by supporting it with the hand or by connecting it to a photographic tripod in other cases, or by simply resting it, in case of a surface allowing it, by supporting it with a hand.

Once initialized the acquisition, the optical group performs a scanning with predefined pitch, for example variable from 5 to 100 μm at the operator's discretion, depending upon the depth to be examined, the objective lens focus from the lowest to the highest point, or viceversa, of the surface under examination.

The acquisition is assisted by the motor 17, moving the cursor 11 with a motion with predefined motion as specified above. At each pitch a sample image is taken, destined then to be processed with the focus scanning technique.

The gathered image data are simultaneously transmitted to the processor 3 and a dedicated software acquires at each pitch the image formed by the optics on the CCD/CMOS sensor, by extracting from each one of the images the in-focus portion and by reconstructing the 3D digital micro-relief of the surface inside the field of view of the optics.

At the process end, a 3D micro-relief on a field with sizes of about 7×7 mm, in case variable by changing the components, is obtained, with the possibility of extracting profiles (sections) and texture parameters (roughness, corrugations, etc.) of the examined surface.

Furthermore, this device can be implemented in a simple way with low-cost components, but it is able to provide higher performances in the region of millimetric field of view, with depth resolution in the order of 10 μm.

Another operating mode consists in using the device to perform a continuous shooting, whereas the motor translates sensor 13 and optical group 14, 15 in continuous way and not with pitch. The continuous shooting is divided into frames which can be processed with the focus scanning technique, with a greater speed of the shooting phase. This mode is particularly useful when the sample is a living sample, for example an epidermis portion.

The above described device can be then constructed in a single palm module with the integration of all components thereof in the optoelectronic device body.

Therefore, the device body portability allows the use in fields without important limitations, so as to be able to result interesting in fields such as that of restoration, dermatology, metallurgic processings, electronics and semi-conductors, in the investigating field and so on.

In conclusion, the above-described device is fit to be produced in a palm format, by assembling the body thereof on a specific, that is said supporting frame; the need for an independent power supply of the instrument is avoided, apart from the one provided by two simple USD ports 23, which in case can be replaced by ports of the same type by reducing even the number thereof, but with the possibility of using battery, too; furthermore, the strongly felt problem of the impossibility of reconstructing partially mirror surfaces is avoided, thanks to the type of the lighting integrated in the optics; and at last the acquisition is wholly automated, including the automatic search for the focus scanning range, implemented on software.

It is further meant that the above described device body could be even positioned thanks to a positioning system with several precision axes.

Furthermore, the ring-like front base, acting as resting base, can be provided with suitable adjustable spacing members, even apt to speed up the first focused display of the surface to be examined.

To the above-described microscopy optoelectronic device a skilled in the art, in order to satisfy additional and contingent needs, could introduce several additional modifications and variants, all within the protective scope of the present invention, as defined by the enclosed claims.

The invention claimed is:

1. A microscopy optoelectronic device (1) with focus scanning, for reconstructing a three-dimensional model of a sample, comprising a portable device body (2), provided with a casing (5) and a frame (6) connected thereto, the frame supporting (6):
   a digital optical sensor (13);
   an optical group (14, 15), coupled to said sensor (13) comprising an objective lens (16) directed towards a distal end of the optoelectronic device body (2), adapted to be facing said sample and defining a focal axis;
   a motor (11, 17, 18) which translates said optical group (14, 15) and said sensor (13) with respect to said frame (6);
   a connector, which connects the optoelectronic device body (2) to an energy source and to a device that controls the position of the optical group (14, 15) and transmits digitalized images to a processor for reconstructing a three-dimensional model of the sample; and
   a light source, which provides a diffused lighting (22) at the objective lens (16), arranged so as to surround a front region with respect to the objective lens (16) and comprising a luminescent and diffusing surface obtained from a shaped sheet so that it has a tubular portion coaxial to the optical group (14, 15) said tubular portion being formed by walls parallel to the focal axis of the optical group or by a single wall with a circular development.

2. The optoelectronic device (1) according to claim 1, wherein said light source, which provides a diffused lighting (22) at the objective lens (16) is integral thereto.

3. The optoelectronic device (1) according to claim 1, wherein the frame (6) comprises at least an upright (8) on an inner face thereof, thereby forming a respective rectilinear guide (10), a cursor (11), supporting said sensor (13) and said optical group (14, 15), being slidingly connected to said guide (10).

4. The optoelectronic device (1) according to claim 1, wherein the frame (6) comprises:
   a ring-like base (7) corresponding to the distal end of the device body (2), adapted to be directed and faced to the surface to be examined, obtaining a three-dimensional relief thereof, performed through the opening of the ring-like base (7); and
   a crossbar (9) opposed to said base (7) supporting said motor (11, 17, 18) and said connector.

5. The optoelectronic device (1) according to claim 1, wherein said optical group (14, 15) is a magnifying optics, with variable magnification.

6. The optoelectronic device (1) according to claim 5, wherein an aspherical lens (14) is provided, arranged at a minimum distance from the outlet lens of an optical group comprising said objective lens (16), so that, once fastened the focal length of the objective lens (16) and the distance thereof from the aspherical lens (14), an object plane is defined having a corresponding image plane coincident with that of the optical sensor (13).

7. The optoelectronic device (1) according to claim 1, wherein said motor comprises a rotary electric motor (17) and a transmission (18), for transforming the rotation into translation of the sensor (13) and of the optical group (14, 15).

8. The optoelectronic device (1) according to claim 1, wherein a control card (21) is provided communicating with a processor by wire or with a wireless transmission, and receiving a power supply directly from said processor.

9. The optoelectronic device (1) according to claim 1, comprising at least one of a rechargeable or an interchangeable battery.

10. The optoelectronic device (1) according to claim 1, wherein the optoelectronic device body (2) is constructed in a single palm module.

11. The optoelectronic device (1) according to claim 1, wherein said tubular portion coaxial to the optical group (14, 15) is arranged so as to produce onto the surface to be examined a component of oblique light of at least 50% of the wholly emitted light.

12. The optoelectronic device (1) according to claim 11, wherein said tubular portion has a circular section.

13. The optoelectronic device (1) according to claim 1, wherein said luminescent and diffusing surface is constituted by a sheet of fluorescent or electroluminescent material.

14. The optoelectronic device (1) according to claim 13, wherein said luminescent and diffusing surface is constituted by a sheet of electroluminescent material of polymeric type, fed by alternated electric current.

15. The optoelectronic device (1) according to claim 13, wherein said luminescent and diffusing surface is constituted by a capacitive sandwich-like sheet and said luminescent and diffusing surface comprises a fluorescent inner dielectric layer of phosphoric type comprised between two conductive layers.

16. The optoelectronic device (1) according to claim 13, wherein said sheet has a cap-like portion, pierced at the objective lens (16).

17. The optoelectronic device (1) according to claim 13, wherein said sheet is inserted in a circular tubular support (24) which is connected to the optical group (15).

18. The optoelectronic device (1) according to claim 13, wherein said sheet is shaped like a tubular portion with a finite number of plane walls, which define distinct lighting directions.

19. The optoelectronic device (1) according to claim 18, wherein said walls can be lighted selectively apart from all together.

* * * * *